(12) United States Patent
Pope

(10) Patent No.: US 6,457,926 B1
(45) Date of Patent: *Oct. 1, 2002

(54) SCREW WITH TAPERED FORMED BUSHING

(76) Inventor: Larry D. Pope, 8530 W. 85th St., South #85, Tulsa, OK (US) 74131

( * ) Notice: Subject to any disclaimer, the term of this patent is extended or adjusted under 35 U.S.C. 154(b) by 0 days.

This patent is subject to a terminal disclaimer.

(21) Appl. No.: 09/730,642

(22) Filed: Dec. 5, 2000

Related U.S. Application Data

(60) Provisional application No. 60/169,251, filed on Dec. 6, 1999.

(51) Int. Cl.⁷ ................................................. F16B 25/00
(52) U.S. Cl. ......................................................... 411/401
(58) Field of Search ................................ 411/482, 400, 411/401, 399

(56) References Cited

U.S. PATENT DOCUMENTS

| | | | |
|---|---|---|---|
| 383,591 A | | 6/1888 | Hegbom |
| 2,048,234 A | * | 7/1936 | Tucker |
| 2,600,974 A | * | 6/1952 | Crawford |
| 4,261,243 A | | 4/1981 | Palmer |
| 4,599,842 A | * | 7/1986 | Counihan |
| 4,932,820 A | | 6/1990 | Schniedermeier |
| 5,011,354 A | | 4/1991 | Brownlee |
| 5,492,452 A | | 2/1996 | Kirsch et al. |
| 5,529,451 A | | 6/1996 | Bruins et al. |
| 5,588,788 A | | 12/1996 | Dominguez |
| 5,755,545 A | | 5/1998 | Banks |
| 5,785,478 A | | 7/1998 | Rotter |
| 6,033,170 A | * | 3/2000 | Gold |
| 6,062,789 A | * | 5/2000 | Pope |

FOREIGN PATENT DOCUMENTS

FR 441533 * 8/1912

* cited by examiner

Primary Examiner—Flemming Saether
(74) Attorney, Agent, or Firm—Molly D. McKay

(57) ABSTRACT

A screw 10 for securing vinyl siding 26 to wall sheathing 28 by inserting a pointed end 20 of the screw 10 through a center of a screw slot 30 provided in an edge of the siding 26. A frusto-conical tapered formed bushing 12 proved on a shaft 14 of the screw 10 adjacent to and spaced apart from a head 16 of the screw 10 so that the screw slot 30 of the siding 26 can be popped into the space between the head 10 and the bushing 12 before the screw 10 is tightened or screwed fully into a wall sheath 28. A smaller flat face 18 of the bushing 12 facing a pointed end 20 of the shaft 14 and a larger flat face 22 facing the head 16. The larger flat face 22 of the tapered formed bushing 12 being either parallel with or at an acute angle to a lower surface 24 of the head 16.

1 Claim, 2 Drawing Sheets

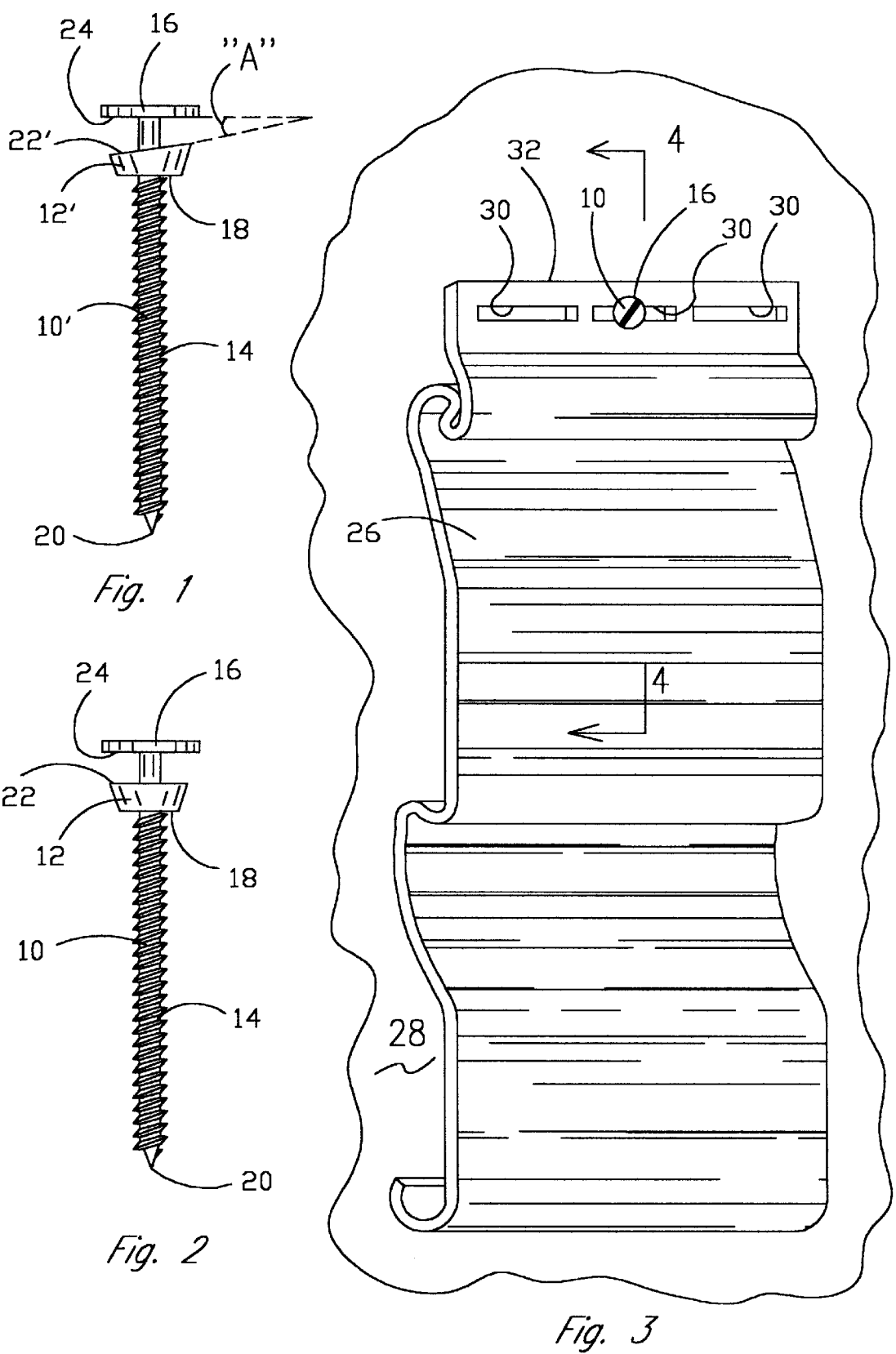

SCREW WITH TAPERED FORMED BUSHING

This application claims the benefit of provisional application No. 60/169,251 filed Dec. 6, 1999.

BACKGROUND OF THE INVENTION

1. Field of the Invention

The present invention relates to a screw for fastening vinyl siding onto a building so that the installer does not have to attempt to avoid overtightening the screw in the siding. When siding is tightly screwed to a building, the vinyl is prevented from moving relative to the screws that secure the siding as the vinyl expands and contracts with changes in the temperature, thus leading to buckling, warping or breakage of the siding.

2. Description of the Related Art

One of the ways that vinyl siding is currently secured to building is to use screws and to screw the siding onto the side of the building. Care must be employed in tightening the screws. If the screw is overtightened, the pressure of the screw can break the vinyl siding as it is tightened. Also, even if the vinyl siding does not break immediately, if the screws are too tightly secured against the siding, this will prevent the vinyl from moving relative to the screw as the vinyl contracts and expands due to fluctuations in the outside temperature. If the vinyl siding is unable to move relative to the screw as it expands and contracts, this can lead to the siding buckling on the building or can cause the siding to be broken or to pull away from the screws.

The present invention addresses this problem by providing a screw with a tapered formed bushing provided on the shaft of the screw adjacent to and spaced slightly apart from the head of the screw. This screw captures the vinyl siding between the tapered bushing and the head of the screw when the screw is employed to secure the siding to a building. The screw of the present invention allows the installer to secure vinyl siding to a building so that the vinyl siding can expand and contract on the building. The screw of the present invention also allows the vinyl siding to move relative to the screw, without the installer having to spend a great deal of time and effort in avoiding overtightening the screw as the vinyl siding is being installed.

3. Description of the Related Art

This application claims priority from U.S. Provisional Patent Application No. 60/169,251, filed on Dec. 6, 1999. Applicant requests that a copy of that Provisional Application be placed in the file wrapper for the present application by the U.S. Patent Office.

The inventor is also the inventor and owner of U.S. Pat. No. 6,062,789 entitled "Nail with Tapered Formed Bushing" which issued on May 16, 2000 for a related invention.

SUMMARY OF THE INVENTION

The present invention is a screw with a tapered formed bushing provided on the shaft of the screw adjacent to and spaced apart from a head of the screw. The tapered formed bushing is frusto-conical with its smaller flat face being oriented toward the pointed end of the screw and with its larger flat face being oriented toward the head of the screw. In a first preferred embodiment of the present invention, the larger flat face of the tapered formed bushing is parallel with the lower surface of the head of the screw. In a second embodiment of the present invention, the larger flat face of the tapered formed bushing lies in a plane that forms an acute angle with the lower surface of the head of the screw.

The screw of the present invention is employed to secure vinyl siding to a building. The pointed end of the screw is inserted through the center of a screw slot provided in an edge of the siding and the screw is screwed into the wall sheathing. The pointed end of the screw may be either a self-taping drill bit or a sharp point for steel studs, red iron, or wooden studs. The wall sheathing may be constructed of plywood, wallboard or other suitable building material. Before the screw is screwed tightly against the vinyl siding, the siding is popped or snapped over the tapered formed bushing so that the slot of the siding is placed between the lower surface of the head of the screw and the larger flat face of the tapered formed bushing. Then the screw is further tightened until the smaller flat face of the tapered formed bushing encounters the wall sheathing. When the smaller flat face of the tapered formed bushing encounters the wall sheathing, the installer will feel resistance when he attempts to tighten the screw further and will stop tightening. In this position, the screw is properly placed to hold the siding, but because the slot is located between the head of the screw and the tapered formed bushing, the vinyl is movably secured to the sheathing by the screw.

In the second embodiment of the present invention, the larger flat face of the tapered formed bushing allows for easier admission of the slot over the tapered formed bushing, thus making it easier to place the siding between the head of the screw and the bushing. This second embodiment also makes it easier to remove the siding from between the head of the screw and the bushing without damage to the siding should it become necessary to remove the siding from the wall.

BRIEF DESCRIPTION OF THE DRAWINGS

FIG. 1 is a side elevation of one embodiment of a screw with tapered formed bushing constructed in accordance with a preferred embodiment of the present invention.

FIG. 2 is a side elevation of another embodiment of a screw with tapered formed bushing constructed in accordance with a preferred embodiment of the present invention.

FIG. 3 is a front perspective view of a piece of vinyl siding, shown with the screw with tapered formed bushing of FIG. 2 securing the siding to wall sheathing.

DETAILED DESCRIPTION OF THE PREFERRED EMBODIMENT

Invention

Figure 4:
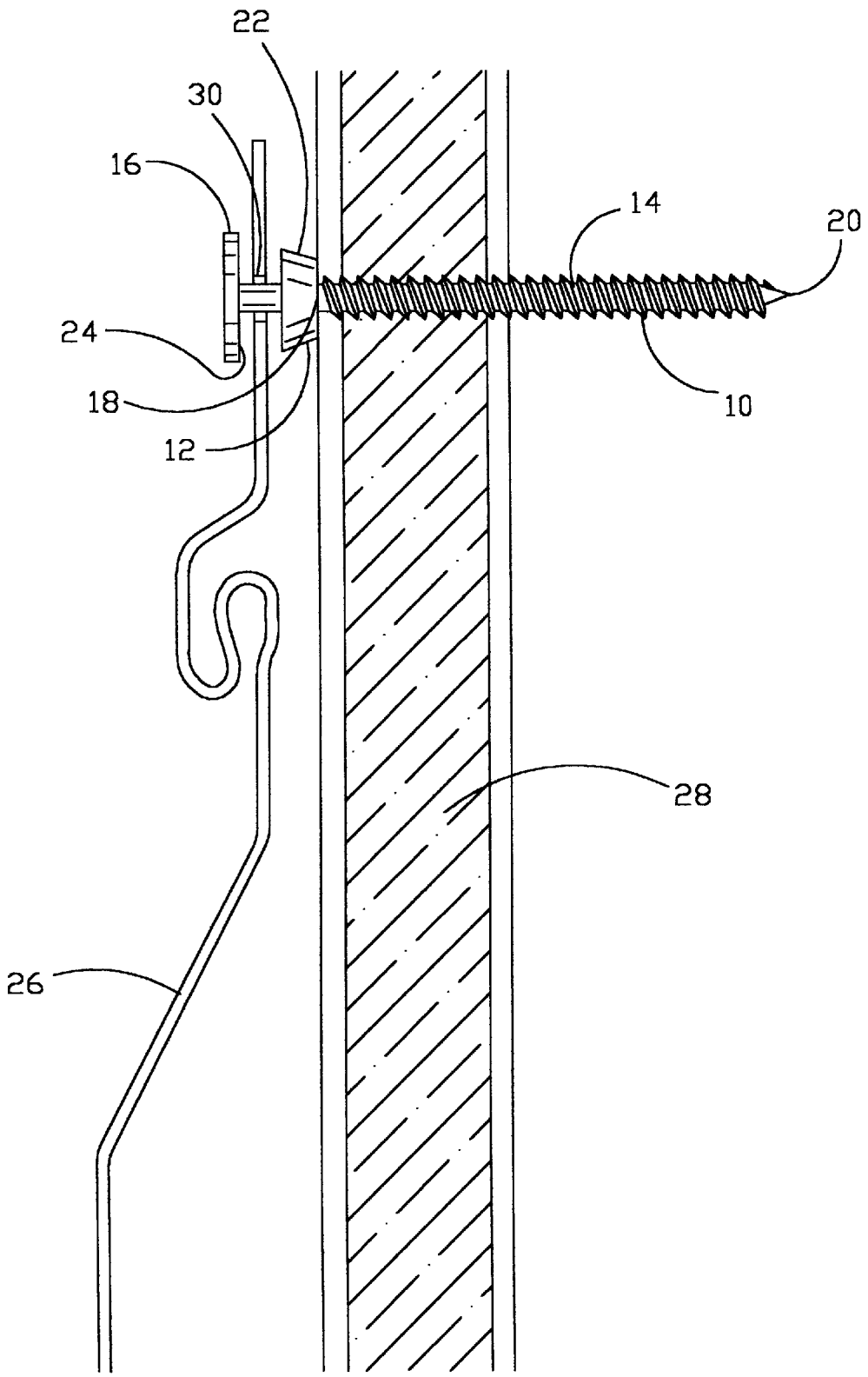
FIG. 4 is a cross sectional view taken along line 4—4 of FIG. 3.

Referring now to the drawings and initially to FIG. 2, there is illustrated a screw with tapered formed bushing 10 constructed in accordance with a preferred embodiment of the present invention. A tapered formed bushing 12 is proved on a shaft 14 of the screw 10 adjacent to and spaced apart from a head 16 of the screw 10 by approximately ⅛ to ¼ inch. The head 16 of the screw 10 may be any common type of screw head, including but not limited to a hex, Phillips, star, Allen, or standard slotted screw head. The tapered formed bushing 12 is frusto-conical with a smaller flat face 18 being oriented toward a pointed end 20 of the shaft 14 of the screw 10 and with a larger flat face 22 being oriented toward the head 16 of the screw 10. The pointed end 20 of the shaft may be either a self-taping drill bit or a sharp point. In a first preferred embodiment of the present invention, the larger flat face 22 of the tapered formed bushing 12 is parallel with a lower surface 24 of the head 16 of the screw

10. In a second embodiment of the present invention, as illustrated in FIG. 1 in association with a first alternate embodiment of the screw 10', an alternate larger flat face 22' of an alternate tapered formed bushing 12' lies in a plane that forms an acute angle "A" with the lower surface 24 of the head 16 of the alternate screw 10'.

The screw 10, or the alternate screw 10', of the present invention is employed to secure vinyl siding 26 to wall sheathing 28 of a building. As illustrated in FIG. 3, the pointed end 20 of the screw 10 or 10' is inserted through a center of a screw slot 30 provided in an edge 32 of the siding 26 and the screw 10 or 10' is tightened into the wall sheathing 28. But, before the screw 10 or 10' is screwed tightly against the vinyl siding 26, the screw slot 30 in the siding 26 is popped or snapped over the tapered formed bushing 12 or 12', as shown in FIG. 4. This places the slot 30 between the lower surface 24 of the head 16 of the screw 10 or 10' and the larger flat face 22 or 22' of the tapered formed bushing 12 or 12'. Then the screw 10 or 10' is further tightened until the smaller flat face 18 of the tapered formed bushing 12 or 12' encounters the wall sheathing 28 as illustrated in FIG. 4.

When the smaller flat face 18 of the tapered formed bushing 12 or 12' encounters the wall sheathing 28, the installer will feel resistance when he attempts to tighten the screw 10 or 10' further and this will signal the installer to stop tightening. With the screw 10 or 10' in this position, the screw 10 or 10' is properly placed to hold the siding 26 to the wall sheathing 28. But, because the screw slot 30 is located between the head 16 of the screw 10 or 10' and the tapered formed bushing 12 or 12', the vinyl siding 28 is free to move laterally relative to the screw 10 or 10' within the bounds allowed by the screw slot 30. This is so since the siding 28 is movably secured to the wall sheathing 28 by the screw 10 or 10'.

The larger flat face 22' of the tapered formed bushing 12' of the alternate embodiment screw 10' allows for easier admission of the screw slot 30 over the tapered formed bushing 12', thus making it easier to place the siding 26 between the head 16 of the screw 10' and the bushing 12'. This second embodiment screw 12' also makes it easier to remove the siding 26 from between the head 16 of the screw 12' and the bushing 12' without damage to the siding 26 in the event that it should it become necessary to remove the siding 26 from the wall sheathing 28.

Although the invention has been described for use with vinyl siding 26, its use is not so limited. The screw 10 or 10' may be used in other applications where it is desirable to secure one item to another item without tightly screwing the two items together.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

What is claimed is:

1. A screw with tapered formed bushing for installing vinyl siding to wall sheathing of a building comprising
   a shaft with a pointed end, a screw head provided on an opposite end of the shaft, and a tapered formed bushing provided on the shaft adjacent to and spaced apart from said screw head,
   a smaller flat face of the bushing extending toward the pointed end of the shaft, and a larger flat face of the bushing extending toward the head of the screw, and
   said larger flat face of the bushing lies in a plane that makes an acute angle with a lower surface of said head of the screw.

* * * * *